Feb. 20, 1934.　　　H. W. RUPPLE　　　1,947,800
DOUBLE CHUCK MACHINE TOOL
Filed Oct. 30, 1931　　　5 Sheets-Sheet 1

INVENTOR:
HARRY W. RUPPLE
Kwis Hudson & Kent
ATTORNEYS

Feb. 20, 1934.  H. W. RUPPLE  1,947,800
DOUBLE CHUCK MACHINE TOOL
Filed Oct. 30, 1931  5 Sheets-Sheet 3

INVENTOR:
HARRY W. RUPPLE
Kwis Hudson & Kent
ATTORNEYS

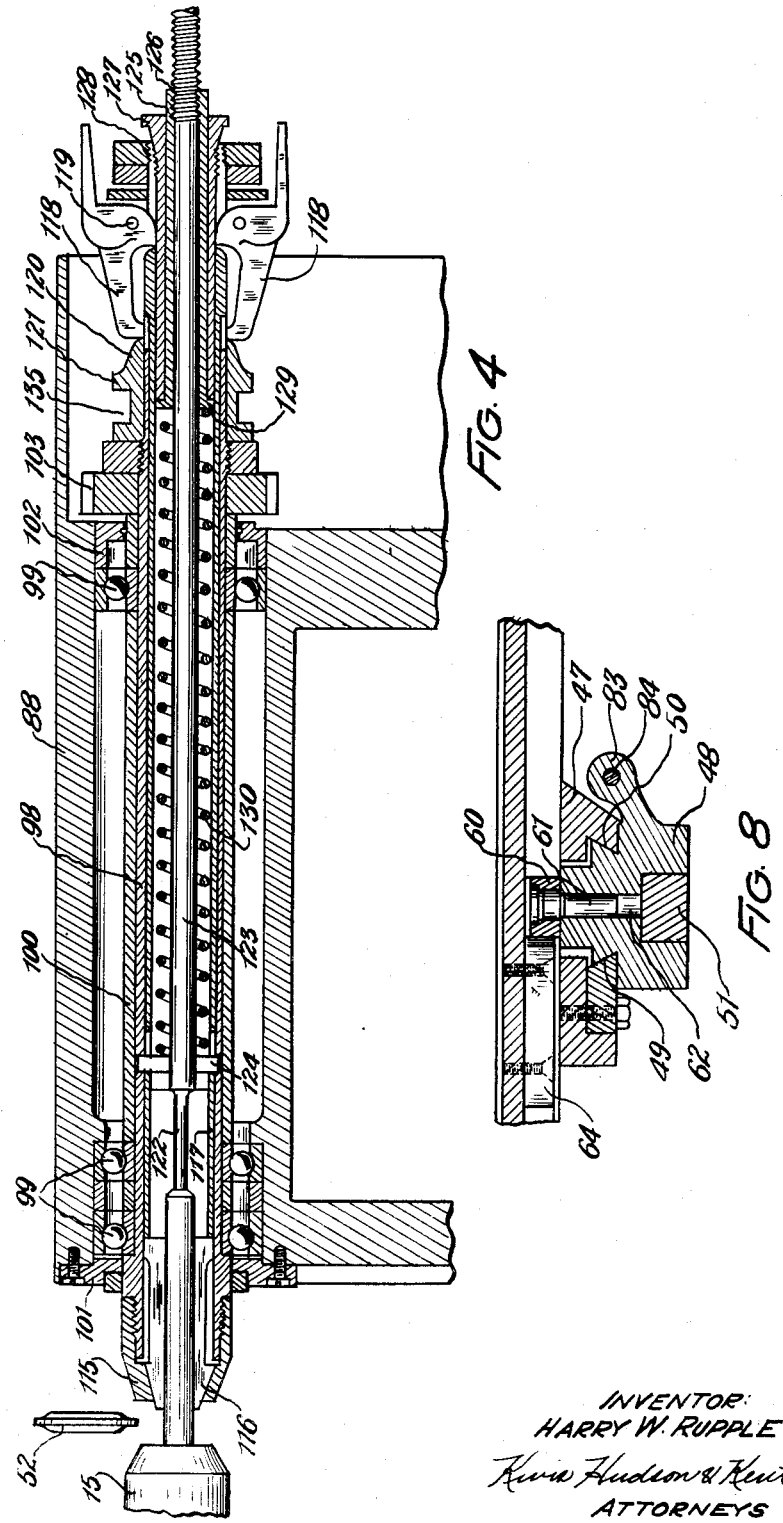

Patented Feb. 20, 1934

1,947,800

UNITED STATES PATENT OFFICE 1,947,800

DOUBLE CHUCK MACHINE TOOL

Harry W. Rupple, Shaker Heights, Ohio, assignor to The Cleveland Automatic Machine Company, Cleveland, Ohio, a corporation of Ohio Application October 30, 1931. Serial No. 572,005

10 Claims. (Cl. 82—3)

This invention relates to metal working machines and more particularly to automatic machine tools of the type adapted to have articles formed by machine operations upon the ends of stock bars or tubes fed through a rotating spindle by automatic means at predetermined intervals. In machines of this general type one of the tools usually is a cutting off tool adapted to cut the formed article from the stock bar after the other operations are completed. Due to its weight, the article, which is unsupported except by its connection to the stock bar, breaks from the stock before the cutting operation is completed, leaving a small burr or unfinished surface on the end of the article which is removed by some subsequent operation.

An object of this invention is the provision of an automatic machine tool of the type adapted to form articles on the ends of work fed through the center of a rotatable spindle which will support the work at the free end during one or more of the machine operations.

Another object of this invention is the provision of an automatic machine tool of the type referred to which will completely form and finish articles from stock fed therethrough.

Another object of this invention is the provision of an automatic machine tool of the type referred to which will sever a bar or tube, etc., and completely finish the cut ends thereof by a single operation.

Another object of this invention is the provision of a supporting means for an automatic machine of the type referred to which will clamp and support the work at the free end thereof during one or more of the machine operations.

Another object of this invention is the provision of an automatic machine tool of the type referred to with alined chucks adapted to support work on both ends thereof during one or more of the machine operations and means for ejecting the work from one of the chucks.

Other objects of the invention will be apparent to those skilled in the art from the following description of the preferred embodiment of the invention described with reference to the accompanying drawings, in which:

Fig. 4 is an enlarged sectional view of the spindle shown in Fig. 3;

Fig. 7 is a sectional view taken on the line 7—7 of Fig. 2; and

Fig. 8 is a sectional view taken on the line 8—8 of Fig. 2.

Figure 1:
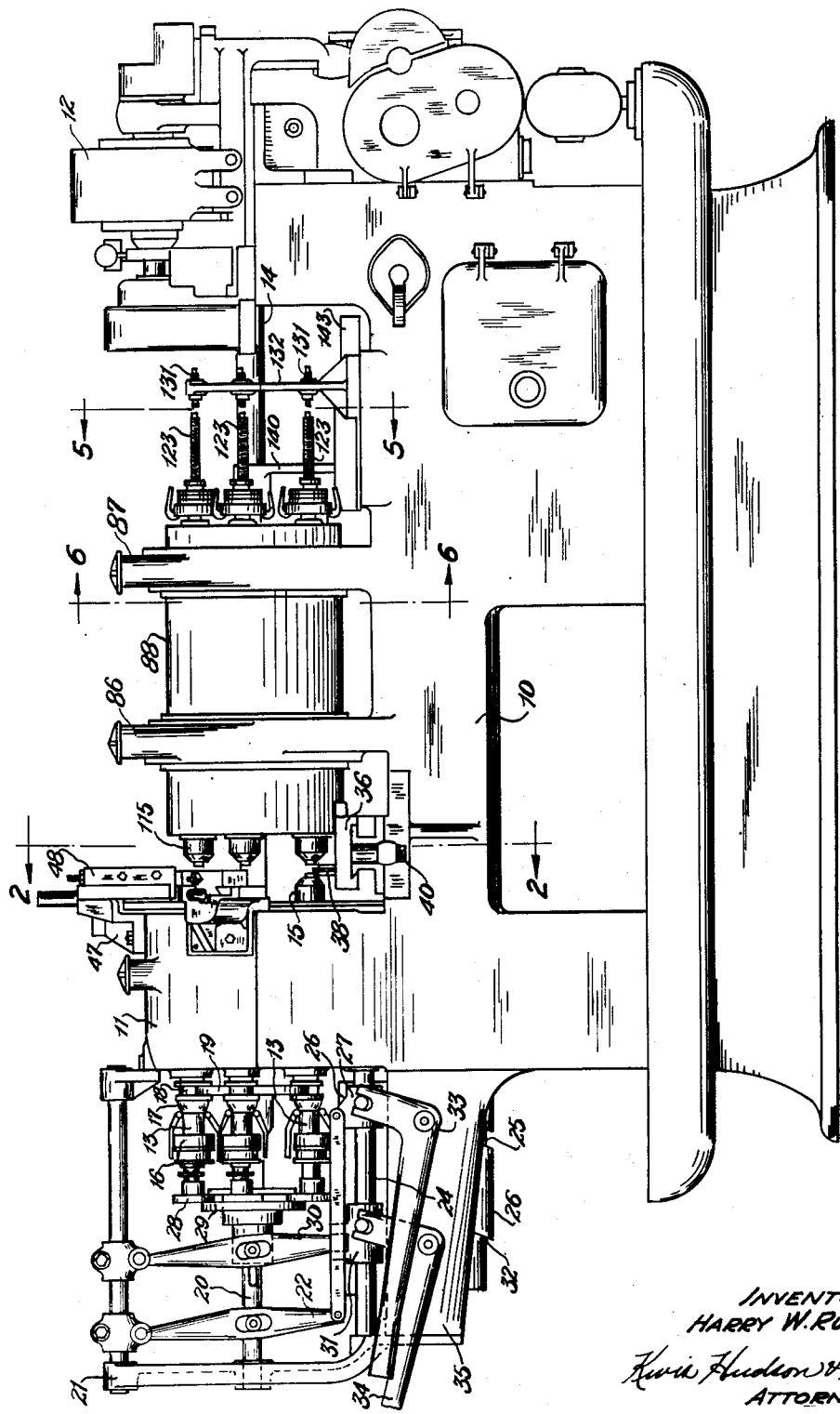
Figure 1 is a front elevation of an automatic machine tool embodying the present invention.
Figure 2:
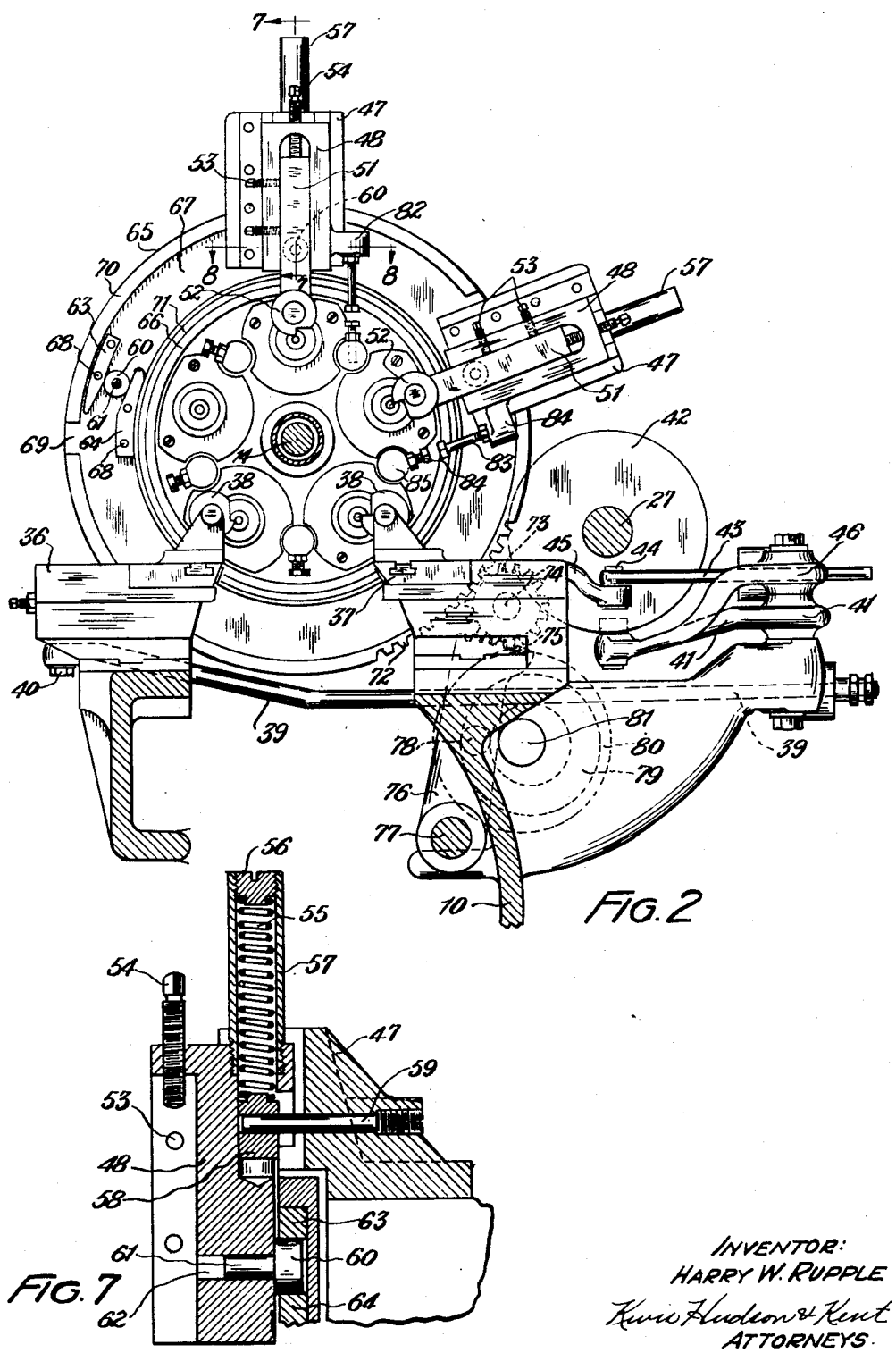
Fig. 2 is a view taken on the line 2—2 of Fig. 1 looking in the direction of the spindle head.

The machine shown in Fig. 1 is a well known type of five position automatic machine tool with the present invention applied thereto and a complete description thereof is considered unnecessary. The various features of these machines are well known in the art and may be found embodied in a plurality of different structures.

The base of the machine is indicated in general by the reference character 10 and supports at one end a spindle head 11 and at the other end conventional mechanism indicated in general by the reference character 12 for driving the various parts of the machine. The spindle head 11 carries a plurality of spindles 13, in the present instance five, rotatably supported in suitable apertures extending longitudinally of the machine and driven from a main drive shaft 14 in any suitable manner. The spindles 13 are adapted to have the work fed through the center thereof and are similar in construction, carrying at one end a chuck 15 adapted to clamp the work and at the other end mechanism indicated in general by the reference character 16 for operating the jaws of the chuck intermittently to grip the stock during the forming operation and to release it while the feeding mechanism is operated. Spindles of the type referred to are shown in United States patent to J. P. Brophy No. 1,779,529 issued October 28, 1930.

The mechanism 16 for operating the jaws of the chuck 15 is adapted to be engaged and operated by a collar member 17 slidably mounted on the spindle 13 and provided with a groove 18 about the periphery thereof. A shoe member 19, adapted to engage in the groove 18, is carried on a shaft 20 slidably supported in a bracket 21 and the spindle head 11. The shaft 20 is operatively connected by mechanism indicated in general by the reference character 22 to a member 23 slidably mounted on two parallel rods 24 fixed in the base of the machine. The member 23 is operated in timed relation to the feeding operation etc. by the engagement of a cam roller in a cam groove 25 on a cam drum 26 carried by the main cam shaft 27 of the machine. Feed collars 28 of the spindles 13 are adapted to be engaged and operated by a shoe member 29 slidably mounted on the shaft 20 and operatively connected by mechanism indicated in general by the reference character 30 to a member 31 slidably mounted on the rods 24 and provided with a cam roller adapted to engage in a cam groove 32 on the cam drum 26.

The members 23 and 31 may be manually operated by bell-crank levers 33 and 34 pivotally mounted on the horn 35 of the machine and provided with yoke ends adapted to engage pins secured to the respective members. The contruction is such that just prior to the feeding operation, the members 17 are moved to release the jaws of the chucks 15, by the shoe member 19, the mechanism 22, the member 23 and the cam drum 26. After the chucks have released the work, the shoe member 29 moves the feed collars 28 toward the right, as viewed in Fig. 1, to feed the work through the spindle, after which the members 17 are moved in the reverse direction by continued rotation of the cam drum 26 and the chuck jaws again engage the work after which the feeding collars 28 are moved to their original positions.

Tool slides 36 and 37 are slidably mounted in suitable guides on the front and rear of the machine respectively and carry tools 38 supported thereon in any well known manner adapted to be fed to and operate on work held in the spindles adjacent thereto. The tool slide 36 is moved by means of a rod 39 pivotally connected at one end to a bolt 40 carried at the front of the slide and at the other end to one arm of a bell-crank lever 41. The other arm of the bell-crank lever 41 carries a cam roller adapted to engage in and be operated by a cam track on the cam drum 42 mounted on the main cam shaft 27. A tool slide 37 is operated by a rod 43 pivotally connected to a pin 44 secured in an arm 45 projecting from said slide and one arm of a bell-crank lever 46. The other arm of the bell-crank lever 46 carries a cam roller adapted to engage in and be operated by a cam track on the cam drum 42. The construction of the slides 36 and 37 and operating mechanism is similar to that shown in United States patent to J. P. Brophy previously referred to.

A bracket 47 is bolted or otherwise secured to the spindle head 11 adjacent each of the three upper spindles. These brackets 47 are similar in construction and carry tools adapted to engage with and operate upon work supported in the respective spindles. Each of the brackets 47 carries a tool slide 48 supported in suitable guide surfaces 49 and 50 provided therein. A tool holder 51 provided with a tool 52 of any suitable nature is adjustably fixed on the tool slide 48 as by the set screws 53 and the stop screws 54. A spring 55 compressed between a closed end 56 of a tube 57 carried by the slide 48 and a member 58 supported on a pin 59 carried in the bracket continuously urges the tool slide in a direction away from the work spindle. A cam roller 60 provided with a hub 61 rotatably mounted on the rear side of the slide 48 in an opening 62 engages with two cams 63 and 64 on a cam disk 65 rotatably mounted on a hub 66 of the spindle head 11. The cams 63 and 64 are located in a recess 67 in the cam disk 65 and are held in position by the screws 68. Openings 69 formed in the outer rim 70 of the cam disk 65 permit removal of the tool slides 48 when the cam disk 65 is so positioned that the openings 69 are in alignment with the cam roller 60. A wear plate 71 is interposed between the hub 66 and the cam disk 65.

The cam disk 65 has formed on the periphery thereof at one side a gear sector 72 adapted to be engaged by a pinion 73 rotatably mounted on a short shaft 74 secured in the base 10 of the machine in any suitable manner. The pinion 73 is also in mesh with a gear sector 75 carried on one end of an arm 76, the other end of which is pivotally supported on a shaft 77 mounted in the base 10 of the machine. The lever 76 is oscillated about the pivot 77 by a cam roller 78 carried by said lever and engaging in a cam groove 79 in the end of a cam drum 80 on a cam shaft 81. The cam shaft 81 is driven from the main cam shaft 27 of the machine by gears, not shown. The construction is such that as the cam disk 65 is oscillated by the engagement of the cam roller 78 on the lever 76 with the cam groove 79 in the cam drum 80, the cams 63 and 64 through the engagement of the cam rollers 60 therewith move the tool slides 48 together with the tools 52 carried thereby toward or from the work, depending upon the direction of movement of said disk. The cam disks 42 and 80 are preferably constructed so that the tools 38 and 52 move in unison, but this is not essential.

Each of the tool slides 48 is provided with a boss 82 having an adjustable stop in the form of a screw 83 threaded in an opening therein and adapted to engage with a similar stop 84 carried on a member 85 fixed to the spindle head 11. These stops operate to limit the feed movement of the tool.

The bed 10 has formed thereon near the center vertically projecting members 86 and 87 which support a tail slide member 88 in alignment with the spindle head. The tail slide member 88 is slidably mounted in suitable bearings in the members 86 and 87 and prevented from rotation therein by the engagement of a key 89 in a groove 90 formed in the periphery of said member. The key 89 is carried on the end of a rod 91 projecting into a closed tube 92 carried in the base 10. The rod 91 is adjustable in the tube 92 by a bolt 93 locked in position by a nut 94. The tail slide member 88 is moved towards and from the spindle head 11 by the engagement of a cam roller 95 fixed thereon in a cam track 96 in a cam drum 97 carried by the main cam shaft 27.

The tail slide member 88 carries a plurality of tail spindles 98 rotatably mounted by anti-friction bearings 99 in alignment with the work spindles 13. A spacer sleeve 100 surrounds each of the spindles 98 between the anti-friction bearings 99 and oil retainer rings 101 and 102 are placed at opposite ends of the spindle outside of the bearings. A gear 103 is keyed on each of the spindles near the right-hand end as viewed in Figs. 3 and 4. The gears 103 are in mesh with a gear 104 provided with a hub 105 mounted in a suitable bearing 106 positioned in a recess 107 in the end web 108 of the tail slide 88. The gear 104 is held in the recess 107 and to the tail slide 88 so that it moves therewith by a spider member 109 bolted to the web 108 as by the bolts 110. A wear disk 111 is positioned between the gear 104 and the spider member 109. The gear 104 is slidably keyed to the main drive shaft 14 by keys 112. The tail slide member 88 is mounted co-axially with the main drive shaft 14 which extends through the center thereof and into the spindle head. A tubular member 113, fixed to a boss 114, on the spindle head 11 projects from the spindle head into the tail slide member 88 and surrounds the main drive shaft 14. The construction is such that the tail spindles 98 are rotated in all positions of the tail slide member by the shaft 14 and the gears 103 and 104.

The tail spindles 98 are similar in construction and carry a chuck 115 at the end thereof adjacent the spindle head. The chuck 115 has chuck jaws 116 automatically operated to engage and disengage the work by a tubular member 117 in the interior of the spindle. The tubular member 117 is moved to engage the jaws 116 with the work by members 118 pivoted on the spindle as at 119. The members 118 are operated by cam surfaces 120 on members 121 slidably mounted on the exterior of the spindle. The construction of the tail spindles 98, so far described, is similar to that of the work spindles 13 and the work spindles shown in the patent previously referred to.

Figure 3:
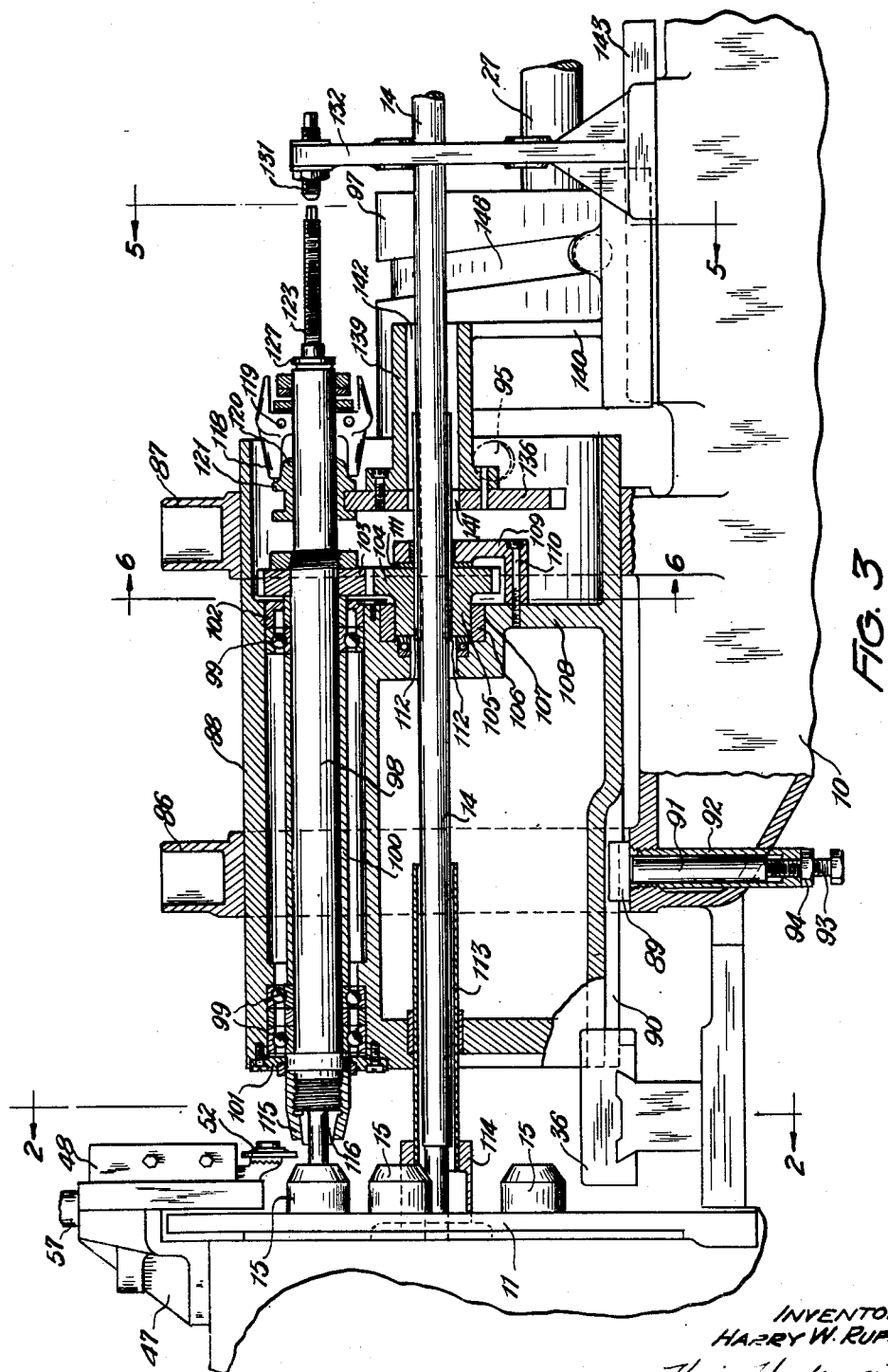
Fig. 3 is a view with parts in elevation taken on the line 3—3 of Fig. 5.
Figure 6:
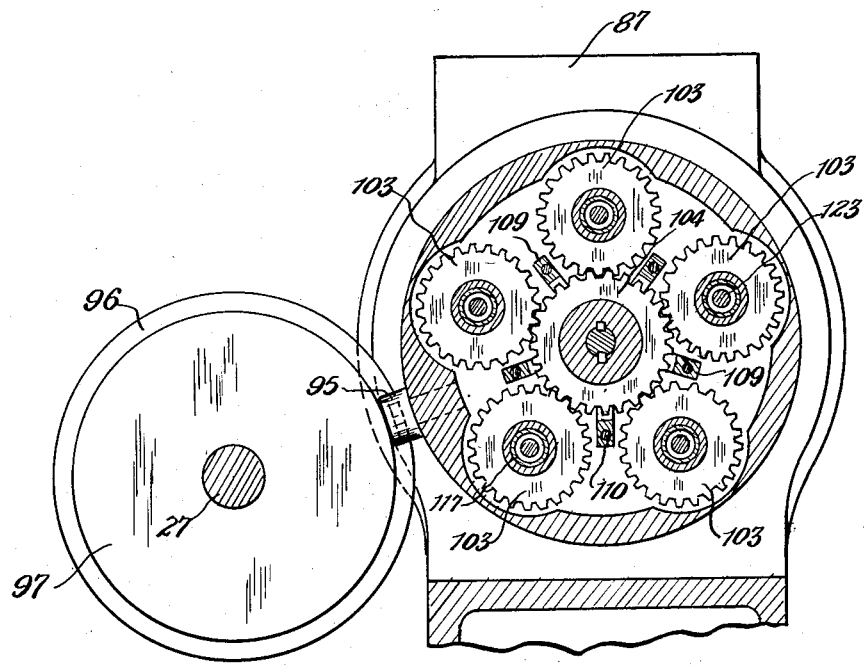
Fig. 6 is a sectional view taken on the line 6—6 of Fig. 1.

Work positioned in the chuck 115 is ejected therefrom upon movement of the tail spindle 98 to the right as viewed in Figs. 3 and 4 by a reduced end 122 of an ejector rod 123. The ejector rod 123 is supported at one end in the spindle by the pins 124 fixed to the spindle and at the other end is a sleeve member 125 threaded as at 126 to the ejector rod 123. The sleeve member 125 is slidably supported in a member 127 fixed to the spindle as by threads 128 and is provided with a flange 129 adapted to abut against the end of the member 127 and limits the movement of the ejector rod 123 and the sleeve member 125 to the right as viewed in Figs. 3 and 4. The ejector rod 123 together with the member 125 is continuously urged towards the right by a spring 130 positioned thereon and compressed between the pins 124 and the flange 129. The ejector rod 123 is moved to eject work from the chuck by the engagement of the right-hand end thereof as viewed in Figs. 1, 3 and 4 with an adjustable stop 131 as the spindle is withdrawn from the spindle head 11. The adjustable stops 131 are carried in alignment with the ejector rods 123 in a bracket 132 secured to the top of the base 10 in any suitable manner.

Figure 5:
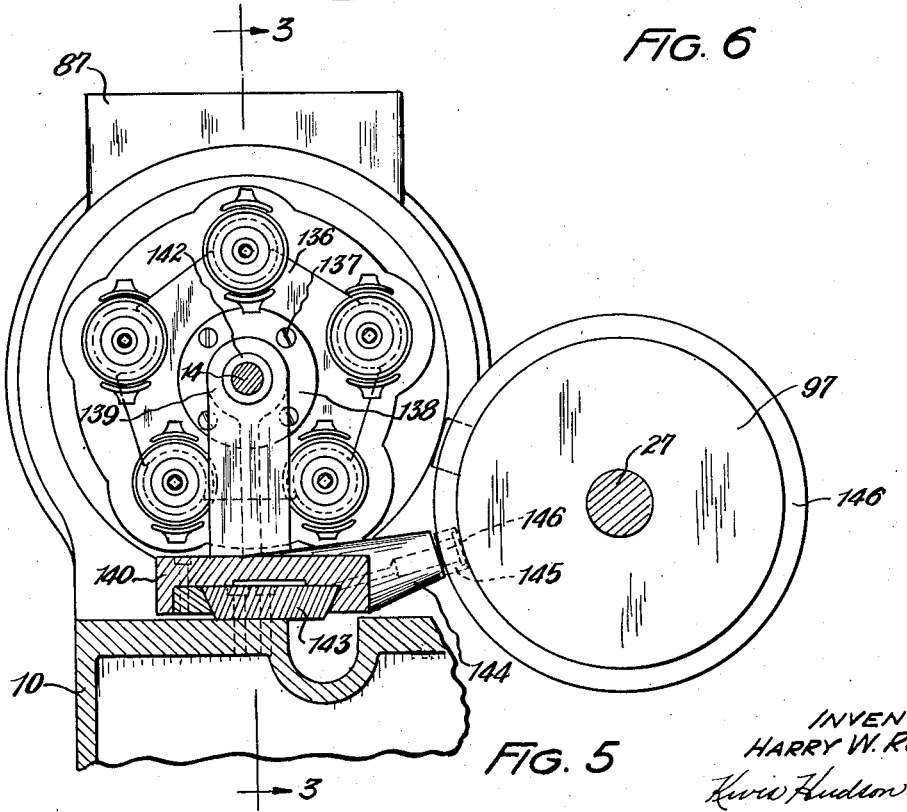
Fig. 5 is a view taken on the line 5—5 of Fig. 1.

Each of the members 121 is provided with a groove 135 about the periphery thereof which is engaged by a shoe 136 secured as by bolts 137 to a flange 138 on the end of a boss 139 carried by a bracket 140. The shoe 136 and the boss 139 are provided with openings 141 and 142 respectively, through which the shaft 14 extends. The bracket 140 is slidably supported by suitable guide surfaces on a guide member 143 fixed to the top of the base 10 and carries a horn 144 projecting to the rear of the machine, see Fig. 5. A cam roller 145 is rotatably mounted on a pin 146 carried by the horn 144 and engages in a cam track 146 in the cam drum 97. The construction is such that the shoe member 136 is moved to open and close the chuck 115 in predetermined timed relation to the other operations of the machine by the cam 97 and the mechanism operated thereby.

The operation of the machine is apparent from the description thereof and it may be summarized as follows. The work is fed through the rotating work spindles in the spindle head at predetermined intervals by the mechanism which includes the feed collars 28 and the feed shoe 29 controlled by the cam groove 32 in the cam drum 26. The chucks 15 are operated to release and engage the work in predetermined timed relation to the feeding movements by the parts 17, 19 etc. controlled by the cam groove 25 in the cam drum 26. The tools are given a simultaneous feeding and return movement by the cam drums 42 and 80 through the mechanism connecting the tool slides to their respective cam drums.

After the work has been fed forward through the work spindles and engaged by the chucks, and before the cutting off tools have started their cutting operation or soon thereafter, the tail slide member 88 is moved by the cam drum 97 towards the spindle head with the chucks 115 open. As the tail spindles 98 are in alignment with the work spindles 13 the chucks 115 advance over the projecting ends of the work, as the movement of the tail slide member 88 towards the spindle head stops, the chuck jaws 116 are engaged with the work to support the free ends thereof. The chuck being operated by the cam drum 97 through the slidable bracket 140 and the shoe 136 etc.

The free end of the work will be thus supported during the cutting off operations after which the tools are retracted, the tail slide member 88 withdrawn and the work again fed through the work spindles and the cycle of operation repeated. During the withdrawal of the tail slide member 88 from the spindle head, the chuck jaws 116 are released and the work therein ejected by the engagement therewith of the ends of the ejector rods 123 which are held stationary by the stop 131.

The mechanism shown at the extreme right-hand end of the machine as viewed in Fig. 1 and designated in general by the reference character 12, is merely a drive motor and the necessary gear train etc. for driving the various parts of the machine and forms no part of the present invention and will not be described. The chuck operating and work feeding mechanism shown in Fig. 1 is claimed in my copending application Serial No. 573,463, filed November 6th, 1931.

The invention has been illustrated as applied to a five position machine, but with slight modifications it can be applied to either a single or multiple position machine of either the stationary or indexible turret types, and such constructions are contemplated within the scope of this invention. The embodiment of the invention described and illustrated is merely the preferred form and I do not wish to be limited to the particular construction shown and described, which may be varied within the scope of this invention, and I particularly point out and claim as my invention:

1. In a machine of the character described, the combination of a frame, a plurality of work spindles rotatably supported by said frame, a plurality of tail spindles rotatably supported by said frame in axial alignment with said work spindles, chuck means supported by each of said work and tail spindles at the adjacent ends thereof adapted to engage and support opposite ends of a work blank, means for operating a plurality of said chuck means in predetermined timed relation at predetermined intervals, means for rotating a plurality of said spindles, and means for supporting a tool adjacent each pair of work and tail spindles.

2. In a machine of the character described, the combination of a frame, a plurality of work spindles rotatably supported by said frame, a tail slide slidably supported by said frame in alignment with said work spindles, means for reciprocating said tail slide towards and from said work spindles, a plurality of tail spindles rotatably supported by said tail slide in axial alignment with said work spindles, chucks supported by said work and tail spindles at the adjacent ends thereof adapted to engage and support opposite ends of a work blank, means for actuating a plurality of said chucks at predetermined intervals and in predetermined timed relation to the reciprocation of said tail slide, means for driving a plurality of said spindles, and means for supporting a tool adjacent each pair of work and tail spindles.

3. In a machine of the character described, the combination of a frame, a plurality of work spindles rotatably supported by said frame, a plurality of tail spindles rotatably supported by said frame in axial alignment with said work spindles, chucks supported by said work and tail spindles at the adjacent ends thereof, means common to all of said work spindles for automatically simultaneously actuating said chucks carried by said work spindles at predetermined intervals, means common to all of said tail spindles for automatically simultaneously actuating said chucks carried by said tail spindles in predetermined timed relation to the actuation of the chucks carried by said work spindles, said chucks supported by said work and tail spindles being adapted to engage and support opposite ends of work, means for rotating a plurality of said spindles, means for supporting a plurality of tools adjacent said work spindles, and means for automatically reciprocating said tool supporting means towards and from said spindles.

4. In a machine of the character described, the combination of a frame, a plurality of work spindles rotatably supported by said frame and adapted to have work fed through the center thereof, means for feeding work through the center of said spindles at predetermined intervals, a plurality of tail spindles rotatably supported by said frame in alignment with said work spindles, chucks carried by said spindles at the adjacent ends thereof, said chucks on said tail spindles being adapted to engage the free end of the work projecting through said work spindles and support the same, means for actuating said chucks supported by both said work and tail spindles in predetermined timed relation to the feeding operation, means for driving a plurality of said spindles, means for supporting a plurality of tools adjacent said work spindles, and means for moving said tools towards and from said spindles in predetermined timed relation to the other operation of the machine.

5. In a machine of the character described, the combination of a frame, a plurality of work spindles rotatably supported by said frame and adapted to have work intermittently fed through the center thereof, means for automatically feeding work through said spindles at predetermined intervals, a tail slide slidably supported by said frame and in alignment with said work spindles, means for automatically reciprocating said tool slide towards and from said work spindles in predetermined timed relation to the actuation of said work feeding means, a plurality of tail spindles rotatably supported by said tool slide in axial alignment with said work spindles, chucks carried by both said work and tail spindles on the adjacent ends thereof, said chucks supported by said tail spindles being adapted to engage the free end of work projecting through said work spindles and support the same, means for automatically actuating said chucks supported by both said work and tail spindles in predetermined timed relation to the actuation of said work feeding means, means for driving a plurality of said spindles, means for supporting a plurality of tools adjacent said work spindles, and means for automatically reciprocating said tools towards and from said work spindles in predetermined timed relation to the other operations of said machine.

6. In a machine of the character described, the combination of a frame, a plurality of work spindles rotatably supported by said frame and adapted to have work intermittently fed through the center thereof, means for driving said work spindles, means for automatically feeding work through said spindles at predetermined intervals, a tail slide slidably supported by said frame and in alignment with said work spindles, means for automatically reciprocating said tool slide towards and from said work spindles in predetermined timed relation to the actuation of said work feeding means, a plurality of tail spindles rotatably supported by said tool slide in axial alignment with said work spindles, chucks carried by both said work and tail spindles on the adjacent ends thereof, said chucks supported by said tail spindles being adapted to engage the free end of work projecting through said work spindles and support the same, means for automatically actuating said chucks supported by both said work and tail spindles in predetermined timed relation to the actuation of said work feeding means, means for supporting a plurality of tools adjacent said work spindles, and means for automatically reciprocating said tools towards and from said work spindles in predetermined timed relation to the other operations of said machine.

7. In a machine of the character described, the combination of a frame, a plurality of work spindles rotatably supported by said frame and adapted to have work intermittently fed through the center thereof, means for driving said work spindles, means for automatically feeding work through said spindles at predetermined intervals, a tail slide slidably supported by said frame and in alignment with said work spindles, means for automatically reciprocating said tool slide towards and from said work spindles in predetermined timed relation to the actuation of said work feeding means, a plurality of tail spindles rotatably supported by said tool slide in axial alignment with said work spindles, chucks carried by both said work and tail spindles on the adjacent ends thereof, said chucks supported by said tail spindles being adapted to engage the free end of work projecting through said work spindles and support the same, means for automatically actuating said chucks supported by both said work and tail spindles in predetermined timed relation to the actuation of said work feeding means, means for supporting a plurality of tools adjacent said work spindles, means for automatically reciprocating said tools towards and from said work spindles in predetermined timed relation to the other operations of said machine, and means for ejecting work from said tail spindles actuated by the movement thereof towards and from said work spindles.

8. In a machine of the character described, the combination of a frame, a plurality of work spindles rotatably supported by said frame and adapted to have work fed through the center thereof, a plurality of tail spindles rotatably supported by said frame in alignment with said work spindles, chucks supported by adjacent ends of said work and tail spindles whereby opposite ends of work are adapted to be engaged and supported by said chucks, means common to said work spindles for automatically and simultaneously actuating said chucks carried by said work spindles, means common to said tail spindles for automatically and simultaneously actuating said chucks carried by said tail spindles in predetermined timed relation to the operation of said chucks carried by said work spindles, means for driving said work spindles, means for automatically feeding work through said work spindles in predetermined timed relation to the operation of said chucks, a plurality of tool supports movably supported by said frame adjacent said work spindles, and means for moving said tool supports in predetermined timed relation to the operation of said chucks.

9. In a machine of the character described, the combination of a frame, a plurality of work spindles rotatably supported by said frame and adapted to have work fed through the center thereof, means for automatically feeding work through the center of said work spindles at predetermined intervals, a tail slide slidably supported by said frame in alignment with said work spindles, means for reciprocating said tail slide towards and from said work spindles in predetermined timed relation to the work feeding operation, a plurality of tail spindles rotatably supported by said tail slide in axial alignment with said work spindles, chucks supported by said work and tail spindles at the adjacent ends thereof adapted to engage and support opposite ends of work, means common to said work spindles for automatically and simultaneously actuating said chucks carried by said work spindles in predetermined timed relation to the work feeding operation, means common to said tail spindles for automatically and simultaneously actuating said chucks carried by said tail spindles in predetermined timed relation to the work feeding operation, means common to said tail spindles for automatically and simultaneously actuating said chucks carried by said tail spindles in predetermined timed relation to the operation of said chucks carried by said work spindles, a plurality of tool supports movably supported by said frame adjacent said spindles, and means for automatically and simultaneously moving said tool supports towards and from said spindles in predetermined timed relation to the other operations of the machine.

10. In a machine of the character described, the combination of a frame, a plurality of work spindles rotatably supported by said frame and adapted to have work fed through the center thereof, means for automatically feeding work through the center of said work spindles at predetermined intervals, a tail slide slidably supported by said frame in alignment with said work spindles, means for reciprocating said tail slide towards and from said work spindles in predetermined timed relation to the work feeding operation, a plurality of tail spindles rotatably supported by said tail slide in axial alignment with said work spindles, chucks supported by said work and tail spindles at the adjacent ends thereof adapted to engage and support opposite ends of work, means common to said work spindles for automatically and simultaneously actuating said chucks carried by said work spindles in predetermined timed relation to the work feeding operation, means common to said tail spindles for automatically and simultaneously actuating said chucks carried by said tail spindles in predetermined timed relation to the work feeding operation, means common to said tail spindles for automatically and simultaneously actuating said chucks carried by said tail spindles in predetermined timed relation to the operation of said chucks carried by said work spindles, a plurality of tool supports movably supported by said frame adjacent said spindles, means for automatically and simultaneously moving said tool supports towards and from said spindles in predetermined timed relation to the other operations of the machine, and means for ejecting work from said tail spindles actuated by the movement of said tail spindles toward and from the work spindles.

HARRY W. RUPPLE.